J. V. M. RISBERG & G. W. JOHANSSON.
YIELDING NECK BEARING.
APPLICATION FILED DEC. 29, 1915.
1,213,546.
Patented Jan. 23, 1917.
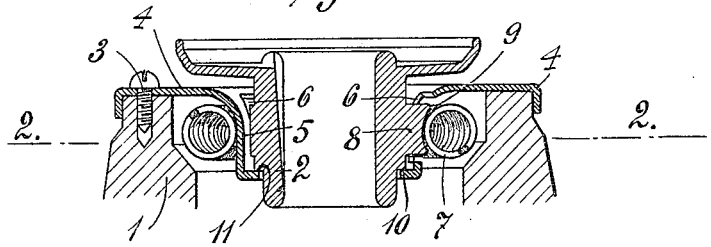
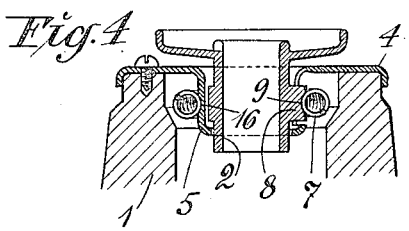
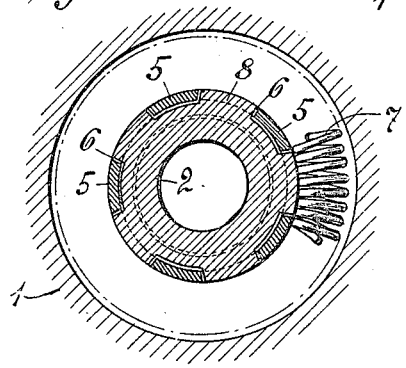
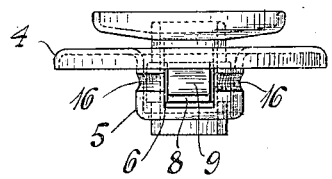
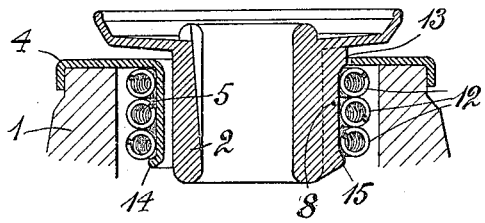
INVENTORS:
J. V. M. RISBERG
G. W. JOHANSSON
BY: H. van Oldemeel
ATTORNEY.

UNITED STATES PATENT OFFICE.

JOHANNES VALDEMAR MÅRTEN RISBERG AND GUSTAF WILHELM JOHANSSON, OF SÖDERTELJE, SWEDEN, ASSIGNORS TO AKTIEBOLAGET BALTIC, OF SÖDERTELJE, SWEDEN, A CORPORATION OF SWEDEN.

YIELDING NECK-BEARING.

1,213,546.  Specification of Letters Patent.  Patented Jan. 23, 1917.

Application filed December 29, 1915. Serial No. 69,220.

*To all whom it may concern:*

Be it known that we, JOHANNES VALDEMAR MÅRTEN RISBERG, a subject of the King of Sweden, and resident of Saltsjögatan 7, Södertelje, in the Kingdom of Sweden, and GUSTAF WILHELM JOHANSSON, a subject of the King of Sweden, and resident of Lowisingatan 9, Södertelje, in the Kingdom of Sweden, have invented certain new and useful Improvements in Yielding Neck-Bearings, of which the following is a specification, reference being had therein to the accompanying drawing.

This invention relates to a yielding neck bearing for the spindle of centrifugal drums and the like.

According to this invention a screw shaped spring, a ring of india rubber or the like is located on the sleeve of the bearing, which spring tends to contract around the sleeve. The position of the spring and consequently the normal position of the said sleeve is fixed by stationary abutments or abutments provided on the frame of the apparatus, against which abutments the spring bears at different points of its inner face and between which projections on the sleeve are located, also acted upon by the spring, so that, if the rotary axis of the spindle does not coincide with the geometrical axis of the same, the sleeve can yield in all directions, laterally, acted upon by the spring, but notwithstanding is sufficiently supported by the spring.

In the accompanying drawing Figure 1 is a vertical central section of a neck bearing arranged in accordance with this invention. Fig. 2 is a section on the line 2 to 2 of Fig. 1. Fig. 3 is a vertical central section of a second form of the bearing. Fig. 4 shows in a vertical central section the preferred form of the yielding bearing. Fig. 5 is a side view of the same bearing, the spring being omitted.

1 is the frame of the apparatus and 2 is the sleeve of the bearing. In Figs. 1 and 2 a disk 4 is fixed to the frame by means of screws 3. The inner part of the disk 4 is bent downward forming a sleeve 5. In the said sleeve 5 openings 6 are provided. The parts of the sleeve 5 located between the openings 6 form stationary abutments for a screw shaped spring 7 inclosing the sleeve 5. The said spring is bent to the shape of a ring and the ends of the same are connected in any suitable manner. The spring 7 is so arranged or the tension of the same is so adapted that it tends to contract. On the sleeve 2 of the bearing, located inside the sleeve 5 projections 8 are provided, which are located in the openings 6 of the sleeve 5 and are acted upon by the spring 7.

The bearing acts in the following manner: During the operation of the separator the spring 7 keeps the sleeve 2 in a position concentric with the sleeve 5. If during the rotation of the drum the rotary axis of the spindle should not coincide with the geometrical axis of the same and consequently the spindle moves the sleeve 2 laterally the projections 8 respectively of the sleeve 2 will expand the spring and consequently increase the tension of the same. The pressure of the spring 7 is greatest at the projection 8 causing the expansion, while the pressure of the spring against the diametrically opposite projection or projections is reduced. Consequently, the spring 7 tends to bring the sleeve 2 back to its normal position. This is the case in whichever direction the sleeve 2 is moved. Consequently, the spring 7 constitutes a yielding support for the sleeve 2 and the spindle, which permits the spindle, while rotating, to perform the oscillating movement of that kind, which is caused by the fact that the rotary axis and the geometrical axis do not coincide.

In order that the sleeve 2 may have a fixed position axially the following means are provided. As shown in Fig. 1 the bearing surface 9 of the projections 8 for the spring 7 is concave. The bearing is so arranged, that the spring bears against the lower part of the surface 9 and against the concave part located between the sleeve 5 and the disk 4 and tends, so to say, to force itself into the space between the said part of the surface 9 and the part connecting the sleeve 5 and the disk 4. This results in the spring forcing the sleeve 2 downward with a weak pressure. The position of the sleeve 2 axially is fixed by an inward projecting flange 10 of the sleeve 5, in contact with which is an offset on the sleeve 2.

In the form of the invention shown in Fig. 3 a plurality of screw shaped springs 12 bent into rings are provided on the sleeves 5 and 2 or a single screw shaped spring is wound around the said sleeves and connected at its ends with the sleeve 5. The said sleeve 5 is provided with openings, as the sleeve 2 shown in Figs. 1 and 2, through which extend projections 8 on the sleeve 2. The uppermost and lowermost springs or the uppermost and lowermost turns of the spring bear with a suitable play against the concave part connecting the sleeve 5 and the disk 4 and offsets 13 in the projections 8 and against projecting parts 14, 15 on the lower ends of the sleeve 5 and the projections 8. Owing to the said arrangement the sleeve 2 is held in a fixed position axially by the springs or the spring.

In the bearing shown in Figs. 4 and 5 the bearing surface 9 provided on the projections 8 of the sleeve 2 for the spring 7 is concave with substantially the same radius of curvature as the turns of the spring. In the downward projecting part of the disk 4 forming the sleeve 5 concave bearing surfaces 16 for the spring 7 are provided, the radius of curvature of which also is substantially equal to that of the said turns. The projections 8 of the sleeve 2 extend radially through the openings 6 of the sleeve 5 and are so adapted that the distance between the concave bearing surfaces 9 of the projections 8 and the central axis of the sleeve 2 is equal to the distance between the concave bearing surfaces 16 of the sleeve 5 and the central axis of the same. Consequently, the spring 7 will keep the sleeve 2 in a central position in the sleeve 5 but permits the same to be moved laterally by the spindle of the drum, as described above with reference to Figs. 1 and 2. Owing to the fact that the bearing surfaces 16 of the sleeve 5 for the spring 7 are concave, the spring will have a fixed position on the sleeve 5 and for that reason the spring, bearing against the concave surfaces 9 of the projections 8 of the sleeve 2, will hold the sleeve 2 in a fixed position axially without the sleeve 2 bearing against a flange (10) on the sleeve 2, as is the case in the arrangement shown in Fig. 1. Consequently, the friction between the offset 11 of the sleeve 2 and the flange 10, Fig. 1, which to some degree prevents the bearing 2 from moving, is fully eliminated in the arrangement shown in Figs. 4 and 5.

The invention may evidently be modified in many respects without exceeding the limits of the same. For instance a wire bent into a ring or a zig-zag shaped wire bent into a ring may be substituted for the spring or the said spring may have any other shape provided that it tends to contract around the sleeve of the bearing. Instead of the spring a ring of india rubber or any other elastic substance may be used.

Having now described our invention, what we claim as new and desire to secure by Letters Patent is:

1. In a yielding neck bearing, the combination of a plurality of fixed abutments arranged in a series around a point; a bearing sleeve placed within said series and provided with a series of projections disposed between the respective abutments; and an elastic means placed around said series and engaging said abutments and projections and bearing against the same with its inner surface.

2. In a yielding neck bearing, the combination of a plurality of fixed abutments arranged in a series around a point; a bearing sleeve placed within said series and provided with a series of projections disposed between the respective abutments; and an elastic ring placed around said series and engaging said abutments and projections and bearing against the same with its inner surface.

3. In a yielding neck bearing, the combination of the sleeve of the bearing, an elastic ring inclosing the same and tending to contract, stationary abutments against which the said ring bears at different points of its inner surface, projections being provided on the said sleeve located between the said abutments and acted upon by the ring, substantially as described and for the purpose set forth.

4. In a yielding neck bearing, the combination of a plurality of fixed abutments arranged in a series around a point and provided with grooved outer faces; a bearing sleeve placed within said series and provided with a series of projections disposed between the respective abutments and provided with grooved outer faces; and an elastic ring placed around said series and engaging said outer faces of the abutments and projections.

5. In a yielding neck bearing, the combination of a plurality of fixed abutments arranged in a series around a point and provided with convexed outer faces; a bearing sleeve placed within said series and provided with a series of projections disposed between the respective abutments and provided with convexed outer faces; and an elastic ring of spiral wire placed around said series and engaging said outer faces of the abutments and projections.

6. In a yielding neck bearing, the combination of a support; a disk thereon; a sleeve shaped part on said disk and provided with a plurality of openings forming a series of abutments therebetween; a bearing sleeve placed in said sleeve shaped part and provided with projections extending through said openings; and an elastic ring placed around said series and engaging said abutments and projections.

In witness whereof, we have hereunto signed our names.

JOHANNES VALDEMAR MÅRTEN RISBERG.
GUSTAF WILHELM JOHANSSON.

Copies of this patent may be obtained for five cents each, by addressing the "Commissioner of Patents. Washington, D. C."